2 Sheets—Sheet 1.
G. & L. SWEET.
Harvester Rake.
No. 9,655. Reissued April 12, 1881.
Fig. 1,
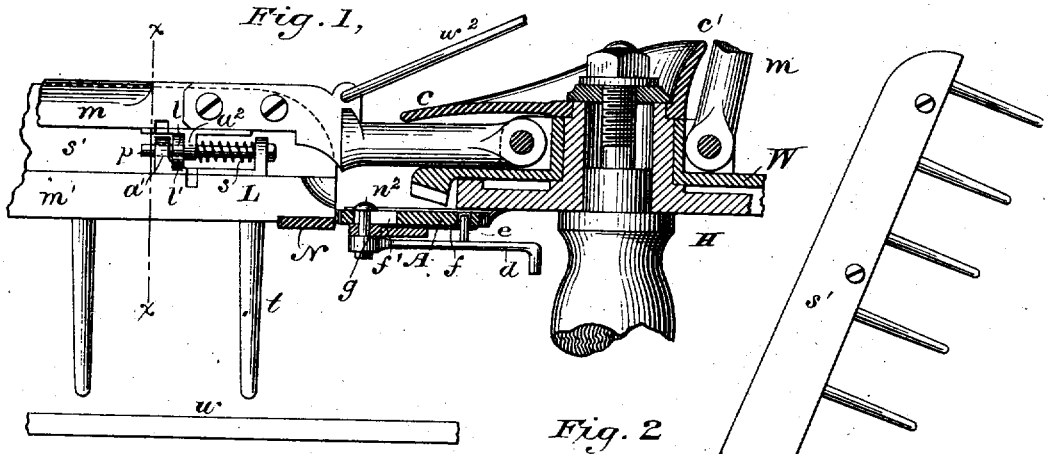
Fig. 2
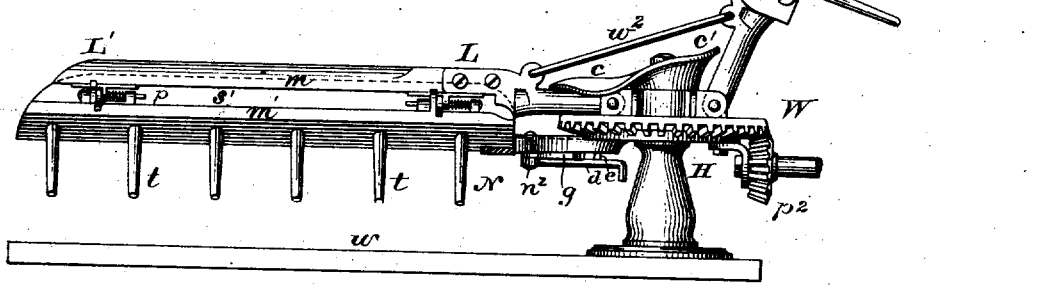
Fig. 4,
Fig. 3,
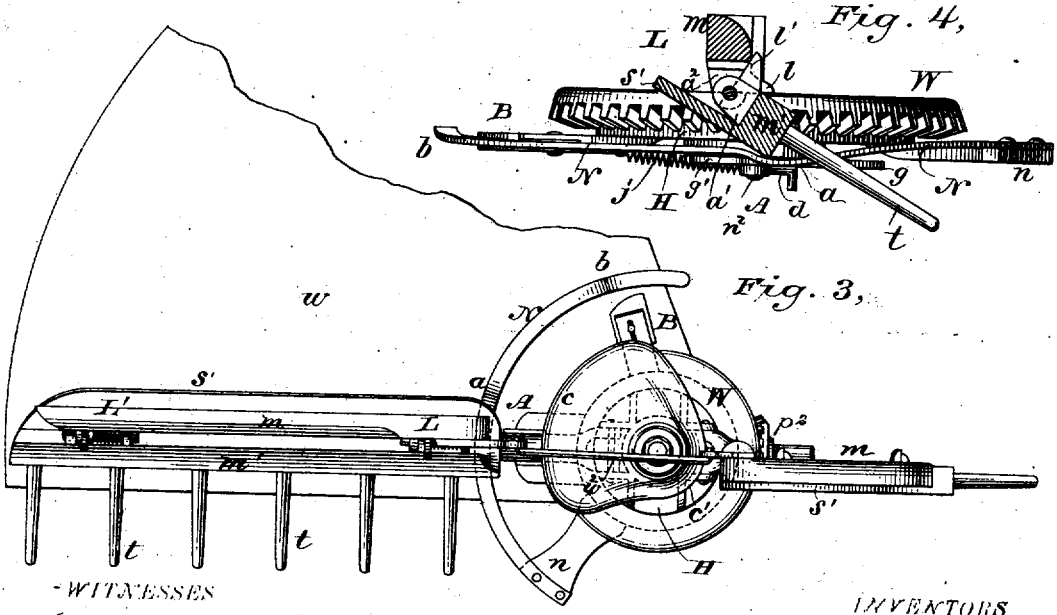
WITNESSES
Wm. A. Skinkle
Geo. W. Beck.
INVENTORS
Lebbeus Sweet,
George Sweet,
by their Attorneys
Baldwin, Hopkins & Peyton.
N. PETERS, PHOTO-LITHOGRAPHER, WASHINGTON, D. C.

G. & L. SWEET.
Harvester Rake.
No. 9,655. Reissued April 12, 1881.
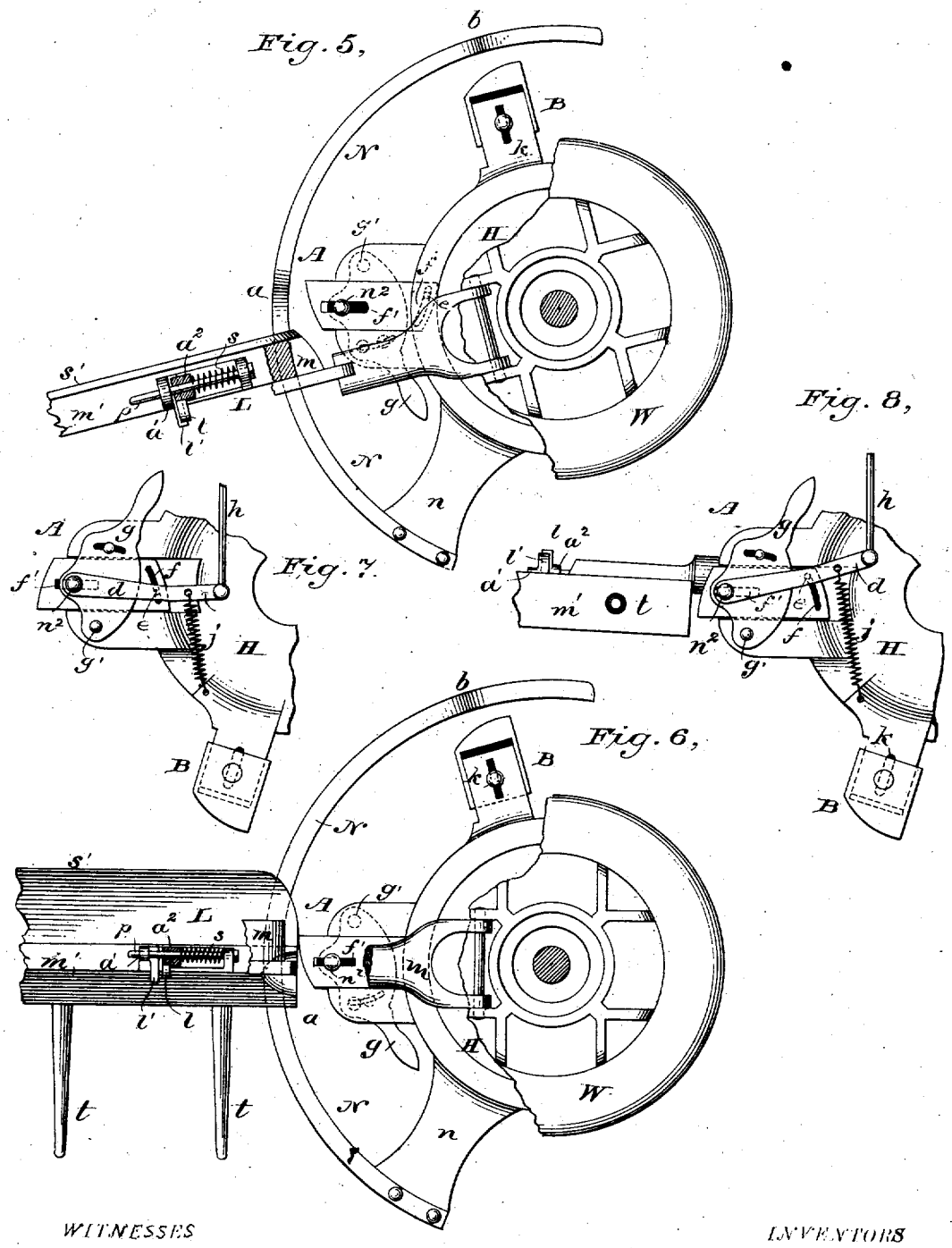
WITNESSES
Wm A. Skinkle
Geo W Breck
By their Attorneys
Baldwin, Hopkins & Peyton
INVENTORS
Lebbeus Sweet,
George Sweet,
N. PETERS PHOTO-LITHOGRAPHER, WASHINGTON, D. C.

UNITED STATES PATENT OFFICE.

GEORGE SWEET, OF NORTH DANSVILLE, AND LEBBEUS SWEET, OF WELLSVILLE, NEW YORK.

HARVESTER-RAKE.

SPECIFICATION forming part of Reissued Letters Patent No. 9,655, dated April 12, 1881.

Original No. 193,355, dated July 24, 1877. Application for reissue filed February 3, 1881.

*To all whom it may concern:*

Be it known that we, GEORGE SWEET and LEBBEUS SWEET, respectively of North Dansville, Livingston county, and of Wellsville, Allegany county, both in the State of New York, have invented certain new and useful Improvements in Combined Rakes and Reels for Harvesters, of which the following is a specification.

Our invention relates to improvements in that class of harvesters having combined rakes and reels in which vibrating or rolling rake-heads are employed. In such machines revolving rising and falling rake-heads can, at the will of the operator, be caused to operate either simply as reel-arms or beaters to force the grain against the cutters, or as both beaters and rakes. In such machines, when acting merely to reel in the grain, the rake-heads are caused, after forcing back the grain to the cutters, to roll, so that the tips or points of the rake-teeth are elevated and pass over the platform above it and without disturbing the grain which is deposited thereon.

By our invention the rolling or vibrating movement of the rake-heads about their longitudinal axes, so as to elevate the teeth above the platform, is the result of the upward pressure and frictional contact of a spring-rail or rake-rolling track, which track yields to downward pressure when the teeth of the rake-heads are to be kept down or are held against rolling, and so forced to act upon the cut grain, as will hereinafter fully be explained. When the rake has about finished its traverse over the platform, and has thereby moved the cut grain thereon to the delivery-edge of the platform to deposit it upon the ground, it is important in this delivery or dropping of the gavel that the grain be not scattered, but be deposited in as compact a gavel as possible, so that it may be readily bound into sheaves.

By our invention, in order that a rake which has passed across the platform with the teeth vertical shall not scatter the gavel as it is being delivered to the ground, we employ a tripping device, whereby the rake is adjusted for rolling to have its teeth elevated above the platform, and thereby leave the grain at the moment that the gavel is being delivered, as will hereinafter fully be explained.

In the apparatus shown by the accompanying drawings, and hereinafter specifically described, and in which only two raking-bars or combined rake-heads and beaters are shown, but in which more, as usual, may be employed, the vibrating or rolling rake-heads are supported at both their inner and outer ends, (instead of at or near their inner ends only, as more usual,) so as to securely support the rake-head and maintain the rake-teeth as nearly as possible in horizontal position, or parallel with the platform in sweeping across it.

The subject-matter deemed novel is hereinafter designated by the claims.

We will now describe our drawings.

Figures 1 and 2 represent general views of our apparatus. (Fig. 1 shows a cross-section of some of the operating parts.) Fig. 3 is a plan view of our apparatus, showing clearly the rake-rolling spring. Fig. 4 is a sectional view of Fig. 1 across the line *x x*. Figs. 5 and 6 are plan views of our apparatus, showing the detail of some of the working parts. Figs. 7 and 8 show the detail of our movable adjustable tripping device as seen from beneath.

Similar letters of reference refer to similar parts in all the drawings.

In our apparatus opposing beater-arms *m m* are attached to a crown-wheel, W, which is revolved by means of a pinion, $p^2$, in the usual way. The opposing arms *m m* are attached to each other by means of a link, $w^2$, so that as one arm falls the other rises. The position of elevation or depression of these arms is determined by the guiding-cam or roadway *c c'*, so that as the arm *m* on the left, Fig. 2, is depressed by the lower part of the cam *c* the other arm is elevated toward the upper part of the cam *c'*. It is therefore evident that as the crown-wheel W is revolved the beater-arms *m* will fall and rise, and will traverse the platform *w* in a plane parallel with it. The beater-arm *m* has attached to it a rake-head, *m'*, carrying the teeth *t*. This beater-arm, as will be observed, extends as far out as the rake-head *m'*. This rake-head *m'* is attached to the beater-arm by means of two corresponding or similarly-constructed pivots and locking apparatus, L and L′, one at the inner and one at the outer end of the beater-arm. This pivot and locking apparatus L (or L′) is of a peculiar character, and the inner one, L, is shown in detail in Figs. 1 and 4. The rake-head has attached to it a pin, *p*, which passes through a lug, $a^2$, attached to *m*, and slides freely upon it—that is, the rake-head *m′* can slide outward through the lug $a^2$ by means of its pin *p*. A spring, *s*, bears against the lug $a^2$ and the inner pin-supporting lug of *m′*, and thereby forces *m′* in toward the center. Therefore the tendency of the two springs of the inner and outer apparatus, L and L′, is to force the rake-head inward, while yet the rake-head will yield to pressure outward, and will, when so pressed, move outward as far as the pins *p* will permit, while in its outward position the rake can roll in its bearings L L′, and thereby the teeth can be brought above and be caused to extend parallel, or nearly so, with the platform *w*; but while in its inner position it is locked and prevented from rolling, as will be now described.

Attached to the lug $a^2$ is the dog or shoulder *l*. The outer lug, *a′*, of *m′* has attached to it a dog or shoulder, *l′*, which parts are shown in detail in Fig. 4. Whenever the teeth *t* are vertical the dog *l′* can pass beneath the dog *l*, and the rake-head *m′* is forced inward by means of the springs *s*, and so long as *l′* is beneath *l* and bearing against it it is evident that *m′* cannot roll in its bearings, and that the teeth and the rake-head are kept vertical; but whenever *m′* is forced outward, so that the dog *l′* is clear of the dog *l*, then it is possible for the rake-head *m′* to roll in its bearings and allow the teeth to assume a tilted, inclined, or horizontal position. The roll of the rake in one direction is stopped by means of the dog *l′* bringing up against the beater-arm *m*, Fig. 4. Its roll in the opposite direction is stopped by means of a shoulder or side piece, *s′*, Fig. 4, connected with *m′*, bringing up against the opposite side of *m*.

From the above description, aided by the drawings, it will readily be understood that each pivot and locking apparatus L and L′ is provided with a pin, *p*, spring *s*, lugs *a′* $a^2$, dogs *l l′*, and shoulder or side piece, *s′*.

As the rake-head traverses the platform *w* a spring, N, bears continually against it and causes a friction against the lower surface of *m′*, which friction has a tendency to throw the teeth upward and to cause the rake-head to roll in its bearings. This spring N is supported by means of an arm, *n*, attached to the rake-standard H of the machine, Fig. 3. There are two bends, angles, or elevations in this spring, one at *a*, opposite the tripping device A, the other at *b*, opposite the tripping device B. By means of these bends or elevations in the spring an increased friction is applied at those points.

It is now evident that, if *m′* be forced outward so that *l′* is clear of *l*, the friction will cause the rake-head to roll in its bearings and to bring the teeth *t* above the platform *w*, and that the upward pressure of the spring will hold these teeth up until the rake-arm *m′* has passed free of it, when the weight of the teeth will cause the rake-head to roll in its bearings till the dog *l′* passes beneath the dog *l*, and the teeth and rake-head are again locked in their vertical position, so that the teeth will always approach the platform *w* in a vertical position, and the apparatus will be adjusted to operate as a raker till the rake-head *m′* is forced outward and has rolled in its bearings. The apparatus for thus forcing the rake-head outward will now be described.

There are two trip devices, A and B, connected to the rake-standard. These trip devices consist of a wedge or cam shaped surface so arranged that it will bring up against the inner end of *m′*, force it outward, and thereby cause the rake-head to roll in its bearings, as has been described.

The back trip, B, is a stationary one, though it is adjustable by means of a slot, *k*, and set-screw, as is clearly shown in Figs. 5 and 6. This trip is so arranged that it will trip the rake-head and cause it to roll at the same instant that it is delivering the gavel to the ground, and thereby a scattering of the grain is prevented.

The forward trip, A, Figs. 7 and 8, is also adjustable, and its position is controlled by the operator at his pleasure. It consists of a trip apparatus, A, having an inclined or wedged surface at its outer end. This piece A slides freely in a mortise-frame or a supporting-slot cut in part of the rake-standard. The piece A moves in or out, and is adjustable by means of a slot, *f′*, through which passes a supporting and guiding pin, $n^2$, as is clearly shown in the figures. Through the rear end of the tripping-piece A there is cut a slot, *f*, curved in the arc of a circle. Through this slot there passes a pin, *e*, upon an arm, *d*, which arm is pivoted on an adjusting-piece, *g*. This adjusting-piece *g* is pivoted at *g′*, so that by its movement the arm *d* can be adjusted inward or outward, so as to act properly. The slot *f* is so cut that as the pin *e* is thrown in one direction the tripping-piece A is drawn inward by the action of the pin *e* against it, while it is thrown outward by the movement of *e* in the opposite direction. The position of *d* is controlled by means of a spring, *j*, in one direction, while the link *h* draws it in the opposite direction at the will of the operator, who can move *h* by a treadle or equivalent device.

It will be observed that the tripping-piece A cannot be forced inward by the pressure of *m′* upon it, while it is readily drawn inward by the movement of the arm *d* at the will of the operator. This tripping device A is so placed that it will roll the teeth upward as soon as they have passed the cutter-bar, so that, in its ordinary position, the entire apparatus will act as a beater; but if the tripping device is drawn in by the operator, then the teeth will pass across the platform vertically, and the apparatus will be a rake. The rake-head will, however, be always tripped and rolled at the back end of the platform, on account of the tripping device B, after having acted as a rake, this permanent back trip being always in operative position, working or ready to work.

It should be noticed that the vertically-swaying or self-adjusting rake-rolling spring-rail or yielding track N is fixedly supported at its front end at a point above and in advance of the platform, and extends rearwardly over the platform at its inner front corner in the arc of a circle of a curvature concentric with the rake-standard or vertical axis about which the combined rising and falling hinged rakes and reels rotate. This horizontally-curved spring N yields to pressure when the rake-heads are held against vibration, as will readily be understood.

We do not broadly claim a vibratable rake-head, or even unqualifiedly such a rake-head when supported at both its inner and outer ends. Neither do we broadly claim the combination of rolling or vibratable combined rakes and reels and means for rolling the rake-heads and for holding them against rolling. Broadly considered, such features and combinations of devices are older than our invention.

We claim as of our own invention—

1. The vertically-yielding horizontally-curved rake-rolling spring, extending from front to rear over the inner front corner of the platform in the arc of a circle concentric with the rake-standard, substantially as and for the purpose hereinbefore set forth.

2. The combination of the platform, the rake-standard, and the rake-rolling spring, supported at its front at a point above and in advance of the platform and extending rearwardly over the platform in the arc of a circle concentric with the rake-standard, substantially as and for the purpose hereinbefore set forth.

3. The combination, substantially as hereinbefore set forth, of the platform, the rake-standard, the series of rake-heads rotating around said standard and having the capacity of vibrating or rolling, and the spring, which spring yields to allow the rake-teeth to sweep the platform, and has also the capacity of acting by upward pressure to vibrate the rake-teeth when the rake-heads are free to roll, and so raise the teeth above the platform.

4. The combination of a platform, a rake-standard, a revolving, rising-and-falling, rolling rake-head, a tripping device, and a spring, the friction of which spring (caused by its upward pressure, together with the movement of rotation of the rake-head about its vertical axis) serves to roll the rake-head and elevate its teeth above the grain upon the platform, substantially as hereinbefore set forth.

5. The combination of a platform, a rake-standard, a revolving, rising-and-falling, rolling rake-head, a rake-rolling spring, and a back trip, substantially as and for the purpose hereinbefore set forth.

6. The combination of the rake-standard, the rising-and-falling rake-head revolving about said standard, and having the capacity of vibrating or rolling about its longitudinal axis, the rake-rolling spring, and the front and back trips, substantially as and for the purpose hereinbefore set forth.

7. The combination, with a rolling rake-head, of a rake-rolling spring having a bevel or angle, and a tripping device, substantially as and for the purpose described.

8. The combination, with a series of rolling rake-heads, of a spring having bevels or angles *a b*, and the front and back tripping devices, substantially as and for the purpose hereinbefore set forth.

9. A beater-arm connected to a rake-head by two supporting locking-pivots, one at the inner and the other at the outer end of the rake-head, whereby the said rake-head is firmly supported and is yet adapted to be rolled when combined with apparatus, substantially as described, whereby the said rake-head is automatically rolled in its bearings and caused to pass over the platform with its teeth elevated.

10. The combination of a rolling rake-head, supported and locked at its inner and outer ends, with the two trips, one (the front trip) being occasionally operative, while the other (the back trip) is always operative, substantially as described.

11. The combination of a lengthwise-moving rolling rake-head with a tripping device and a spring, the friction of which spring as the rake-head revolves, together with the longitudinal movement of the rake-head, serves to roll the rake-head in its supporting-bearings, substantially as described.

12. A rolling rake-head movable longitudinally when combined with a longitudinally-acting spring bearing against said rake-head, substantially as described.

13. The combination of a rake-head supported and locked at the inner and outer ends, and having the capacity of vibrating about its longitudinal axis, with a back trip which serves to unlock or free the rake-head for rolling in its bearings when delivering a gavel, substantially as described.

14. The combination of a rolling rake-head with the supporting-pivot *p*, the spring *s*, the lugs $a'$ $a^2$, and the dogs $l$ $l'$, substantially as described.

15. The combination of the rake-standard, the movable tripping device, supported and sliding in a mortise or slot in the rake-standard and provided with the curved transverse slot, and the pivoted arm, provided with a pin working in said slot, and by means of which the tripper is actuated and held in position, substantially as described.

16. The combination of the rake-standard, the slotted sliding tripping-piece, the pivoted actuating-arm, its pin working in the slot of the tripping-piece, and the adjusting-piece, to which said actuating-arm is pivoted, substantially as and for the purpose hereinbefore set forth.

In testimony whereof we have hereunto subscribed our names.

GEORGE SWEET.
LEBBEUS SWEET.

Witnesses:
O. T. SEYMOUR,
O. S. THORNE.